(Model.)
G. JOHNSTON.
OPTOMETER.
No. 254,139. Patented Feb. 28, 1882.
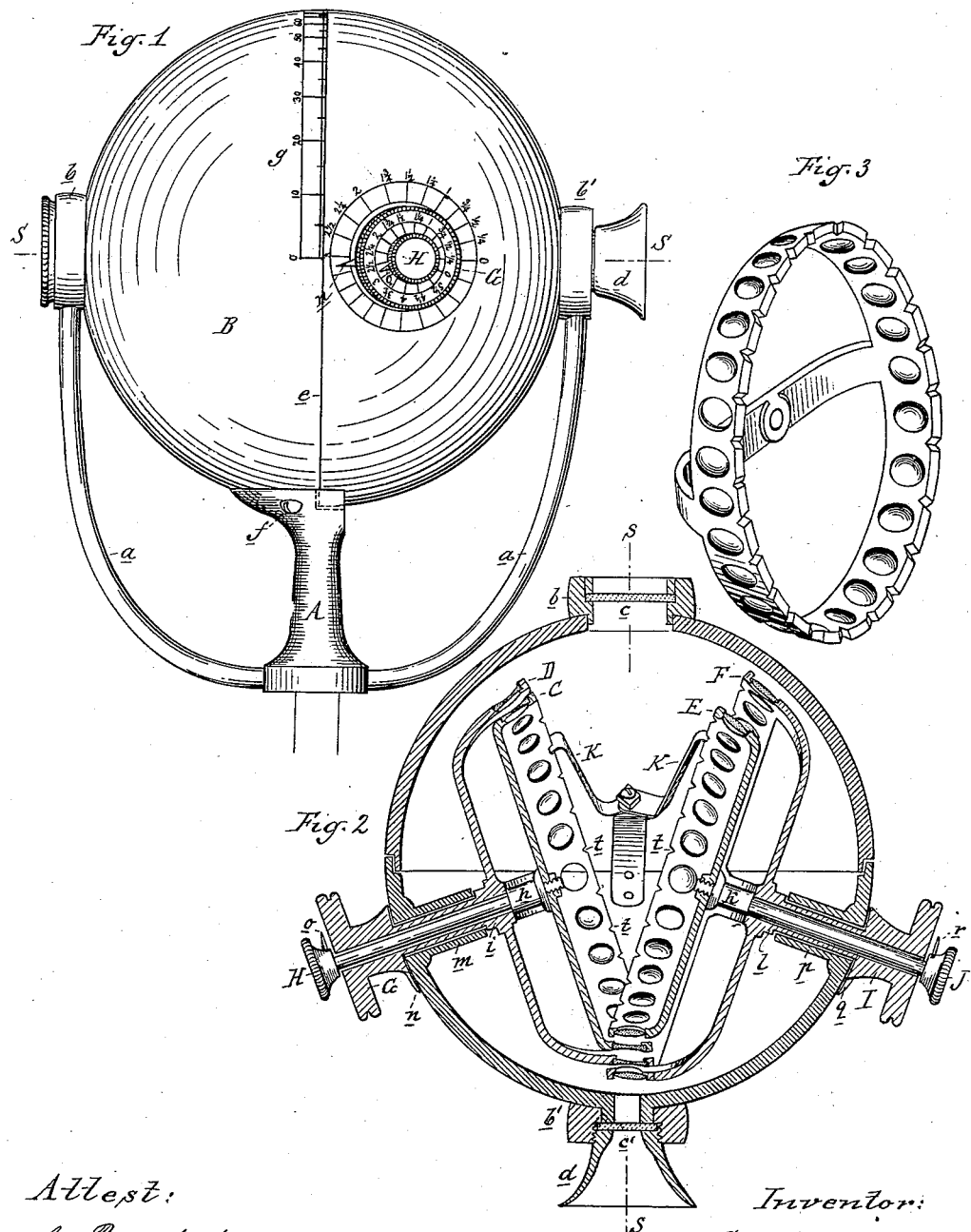
Attest:
A. Barthel
E. Scully
Inventor:
Geo. Johnston
per Thos. S. Sprague
Atty

UNITED STATES PATENT OFFICE.

GEORGE JOHNSTON, OF DETROIT, MICHIGAN.

OPTOMETER.

SPECIFICATION forming part of Letters Patent No. 254,139, dated February 28, 1882.

Application filed September 28, 1881. (Model.)

*To all whom it may concern:*

Be it known that I, GEORGE JOHNSTON, of the city of Detroit, in the county of Wayne and State of Michigan, have invented an Improvement in Optometers or Eye-Testers, of which the following is a specification.

The nature of this improvement relates to that class of optical instruments known as optometers and commonly called "eye-testers;" and the object of the invention is to produce an eye-tester capable of testing eyes not only in regard to the ordinary causes of short or far sightedness, and which are corrected by spherical lenses, but also in regard to that deformity of sight called "astigmatism," which is corrected by the use of cylindrical lenses.

Heretofore when eyes had to be examined for astigmatism a set of cylindrical lenses was all the apparatus used, by the help of which the examiner determined in a simple way the degree of astigmatism; but he had no way of arriving at an easy and accurate determination of the kind of astigmatism. As it is now well known that astigmatism of the eye is an affection always more or less associated with short or far sightedness, it requires a combination of spherical and cylindrical lenses to properly correct such deformity of sight, and it was therefore, with the means heretofore at hand— that is, different sets of test-glasses—a very unsatisfactory and tedious way of testing eyes for short or far sightedness when combined with astigmatism.

By the use of my instrument the testing of the eyes for astigmatism, either singly or in combination with far or near sightedness, is made both easy and accurate, as all possible combinations between the lenses of the different sets of test-glasses can be made in the most easy and quickest manner, and the angle of astigmatism is also determined with mathematical accuracy, all in the manner and by the means hereinafter described.

In the drawings which accompany this specification, Figure 1 is a side elevation of my tester. Fig. 2 is a horizontal central section thereof. Fig. 3 is a detached view of one of the rings which carries a set of test-lenses.

In the drawings, A is a standard upon which my apparatus is mounted, the standard being arranged in any convenient manner to allow of the adjustment of the apparatus to different heights. Springing from the standard A are the two arms $a\ a$, terminating in bearings $b\ b'$, in which the hollow globe B rests. The bearings $b\ b'$ have circular openings corresponding with similar openings, $c\ c'$, in the globe. The line of sight S S passes centrally through these openings and through the center of the globe. The bearing $b'$ has secured to it the eye-piece $d$, to which the eye is applied in testing. Both the openings $c\ c'$ are closed with plain glass, so as to keep dust from entering the interior of the hollow globe B. The globe B is made of two hollow half-globes joining on the line $e$. The half-globe which rests on the bearing $b$ is made stationary by being secured to the standard A with a screw, $f$. The other half-globe is capable of being rotated on its axis, which is coincident with the line of sight S S, the number of degrees of such rotation being indicated by an index, $g$, upon the stationary half-globe along the line $e$.

C D E F are four conical rings. Each ring has set in its face, properly spaced, a complete set of test-glasses. In the drawings, the ring C contains a set of concave cylindrical lenses, the ring D concave spherical ones, the ring E a set of convex cylindrical lenses, and the ring F convex spherical ones. These disks are mounted upon shafts $h\ i\ k\ l$, in pairs, in such manner that the shafts of the rings which bear the concave lenses and those which bear the convex lenses have a common axis respectively. The shafts $i\ h$ revolve in bearings $m$, and are provided outside the globe with hand-wheels or knobs G H, carrying index-fingers $n\ o$. The shafts $k\ l$ revolve in bearings $p$, and are provided with the knobs or hand-wheels I J, carrying index-fingers $q\ r$.

Each shaft can be rotated by means of the knobs or hand-wheels perfectly independent of any other shaft, thus allowing the operator to display any desired lens of any of the four sets of lenses back of the opening $c'$, across the line of sight S S, the indexes around the knobs being so arranged as to indicate the number of the lens displayed by the respective ring back of the opening $c'$. To leave the sight unobstructed by the rings the shafts $h\ i$ and $k\ l$ are passing through the movable half-globe angularly; and in order to get the lenses, when exposed back of the opening $c$, in planes at right angles across the line of sight, the axes of the shafts are put radial to the globe, while the faces of the rings are made conical, their sizes being of proper proportions to allow the lenses to be brought as near as possible to the opening $c'$ without interfering with the free movement of each ring.

To prevent accidental displacement of the lens or lenses when brought into the desired position across the line of sight a spring-pawl, K, is arranged for each disk, (two of them being shown in the drawings only,) which engages with proper notches, $t$, into one edge of the ring, and as there is one notch for each lens the operator, by turning the knob of any shaft and keeping his eye on the index, can easily move any desired lens in its proper position across the line of sight, where it will be kept by the spring-pawl, engaging with the proper notch, against accidental displacement. Each of the four disks, besides containing a full set of test-lenses, contains also one blank, which upon the index is indicated by $v$.

In practice the index of each ring whose lenses are not wanted for examination is set upon zero, which leaves the operator free to examine with the desired set or sets by bringing any desired lens in the line of sight.

If an eye is examined for astigmatism, the operator, after the proper lense or combination of lenses which will counteract the defective eyesight under examination is found, can now easily determine the angle under which astigmatism takes place by rotating the movable half-globe on its axis (which is coincident with the line of sight) one way or another until the best result is obtained, when a simple reading upon the scale $g$ will tell the operator the angle of astigmatism.

I am aware that it is not new to provide an optometer or eye-tester with revolving disks in which glasses of different focal power are held, and therefore I do not broadly claim revolving disks provided with lenses of different forms or qualities.

What I claim as my invention is—

1. In an optometer or eye-tester, one or more sets of frames carrying lenses of different focal power and quality, and adapted to revolve at different angles, whereby any one of the lenses of one frame can be brought into a direct line of vision with any one of the lenses of the other frame or frames, substantially as and for the purpose specified.

2. In an optometer, and in combination with a suitable supporting-frame, one or more sets of rings or frames carrying lenses of different focal power and quality, said frames being secured to shafts mounted at an angle to each other, substantially as and for the purpose described.

3. In combination with a series of lens-carrying frames supported at two different angles, as described, a frame for supporting said lens-frames, adapted to be turned or partly turned, whereby each lens in the lens-frames can be rotated upon the line or axis of sight, substantially as and for the purpose specified.

4. In an optometer, and in combination with a suitable supporting-frame, two or more sets of shafts mounted at different angles to the line of vision through the supporting-frame, and each shaft provided at its inner end with a frame or ring provided with a series of lenses of different focal power, and a blank opening, substantially as and for the purpose specified.

5. In an optometer, the combination of the rings or frames C D E F, carrying lenses of different quality and power, and arranged in two sets, each set being mounted on shafts independent from and at an angle to the shafts of the opposite set, substantially as described.

6. In an optometer, the frame B, consisting of one stationary and one revolving section, in combination with shafts and lens-frames arranged at different angles within said revoluble section, and suitable gages for indicating the proper movement of the supporting and the lens frames, substantially as and for the purpose specified.

7. In an optometer, the combination of the lens-frames D F, secured to tubular shafts $i\ l$, mounted at different angles, the lens-frames C E, secured to shafts $h\ k$, revolving in said tubular shafts $i\ l$, and the supporting-frame B, made in one stationary and one movable section, said movable section carrying the shafts and lens-frames, substantially as and for the purpose specified.

GEO. JOHNSTON.

Witnesses:
H. S. SPRAGUE,
E. SCULLY.